United States Patent [19]

Day, Jr. et al.

[11] Patent Number: 4,763,356
[45] Date of Patent: Aug. 9, 1988

[54] TOUCH SCREEN FORM ENTRY SYSTEM

[75] Inventors: Benjamin W. Day, Jr., Rumson; Alexander C. Gillon, Aberdeen; Raoul A. LeConte, Howell, all of N.J.

[73] Assignee: AT&T Information Systems, Inc. American Telephone and Telegraph Company, Murray Hill, N.J.

[21] Appl. No.: 940,408

[22] Filed: Dec. 11, 1986

[51] Int. Cl.$^4$ .................... H04M 1/23; G06F 15/18; G08C 21/00
[52] U.S. Cl. .................... 379/368; 379/396; 340/712; 340/734; 178/18; 364/900
[58] Field of Search .................... 379/93, 96, 100, 396, 379/354, 368; 178/18, 19, 20; 340/712, 734, 365 C, 365 P, 365 VL; 364/200 MS File, 900 MS File

[56] References Cited

U.S. PATENT DOCUMENTS

| | | | |
|---|---|---|---|
| 4,185,282 | 1/1980 | Pick | 340/711 |
| 4,202,041 | 5/1980 | Kaplow et al. | 364/900 |
| 4,224,615 | 9/1980 | Penz | 340/712 |
| 4,291,198 | 9/1981 | Anderson et al. | 376/96 |
| 4,431,870 | 2/1984 | May et al. | 379/354 X |
| 4,451,895 | 5/1984 | Sliwkowski | 364/521 |
| 4,649,499 | 3/1987 | Sutton et al. | 178/18 X |
| 4,653,086 | 3/1987 | Laube | 379/96 |
| 4,659,876 | 4/1987 | Sullivan et al. | 379/96 |
| 4,725,694 | 2/1988 | Auer et al. | 178/18 |

FOREIGN PATENT DOCUMENTS

59-170929 9/1984 Japan .................... 340/712

OTHER PUBLICATIONS

Linda Lowe, "System for Terminals Creates Keyboards Anyone Can Use," Electronics, Jun. 5, 1980, pp. 39 and 40.

To Russell Hsing, Hoa Anh Quach, Charles LeBlanc and James C. Stoddard, "An Interactive Touch Phone for Office Automation," IEEE Communications Magazine, Feb. 1985–vol. 23, No. 2, pp. 21 through 26.

Werner Horn, Robert Trappl, Dietmar Ulrich, and Gerhard Chroust, "A Frame-Based Real-Time Graphic Interaction System," European Meeting on Cybernetics and Systems Research, 1984, pp. 825 through 830.

To Russell Hsing, Hoa Anh Quach, Charles LeBlanc, Ralph Mednick, and Leonard Abraham, "An Interactive Touch Phone for Future Offices," IEEE International Conference on Communications, 20th, Amsterdam, May 14–17, 1984, pp. 272 through 275.

*Primary Examiner*—Keith E. George
*Attorney, Agent, or Firm*—Frederick B. Luludis

[57] ABSTRACT

A personal computer connected to a display and touch screen panel is provided with a form entry system integrated therewith. The form entry system is adapted to display a predefined form and to automatically display a predefined tool, such as a keyboard, menu, calculator, etc., to facilitate inputting information in a respective field of the form or chart. Specifically, the user is prompted as to which field is to be filled in by highlighting the field and concurrently displaying as an overlay (window) the tool that the user will use to input the information called for by the highlighted field. In the case where a field calls for illustratively the insertion of a name, the system may be adapted to display a menu of names as the tool for filling in that field. The user selects the name that he or she desired to be inserted in the field by touching that name. The system responsive thereto inserts the name in that field, highlights the next field to be filled in and displays the tool for filling that field. The system may also be adapted to communicate with a host computer to obtain the information that is to be inserted in one or more fields. Also, the user may erase the tool that is displayed by the system and direct the system to display another tool, such as the aforementioned keyboard.

22 Claims, 17 Drawing Sheets

Figure 8:
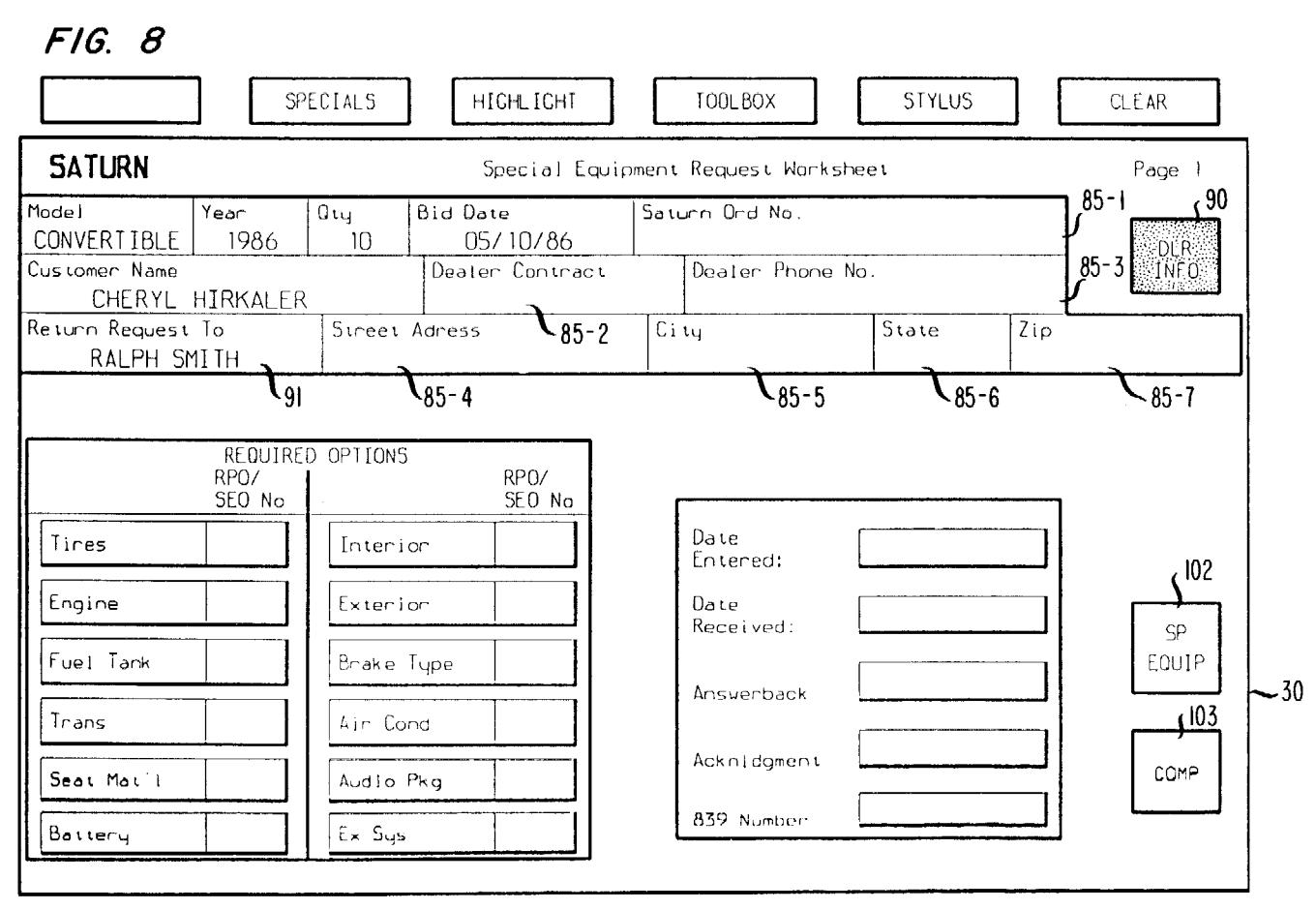

*(Special Equipment Request Worksheet - Saturn)*

Buttons across top: SPECIALS | HIGHLIGHT | TOOLBOX | STYLUS | CLEAR

SATURN — Special Equipment Request Worksheet — Page 1

| Model | Year | Qty | Bid Date | Saturn Ord No. |
|---|---|---|---|---|
| CONVERTIBLE | 1986 | 10 | 05/10/86 | |

Customer Name: CHERYL HIRKALER
Return Request To: RALPH SMITH

Dealer Contract | Dealer Phone No.
Street Adress | City | State | Zip

Fields: 85-1, 85-2, 85-3, 85-4, 85-5, 85-6, 85-7, 90 (DLR INFO), 91

Date Entered:
Date Received:
Answerback
Acknldgment
839 Number

REQUIRED OPTIONS
RPO/SEO No: Tires, Engine, Fuel Tank, Trans, Seat Mat'l, Battery
RPO/SEO No: Interior, Exterior, Brake Type, Air Cond, Audio Pkg, Ex Sys

102 SP EQUIP | 103 COMP | 30

FIG. 9

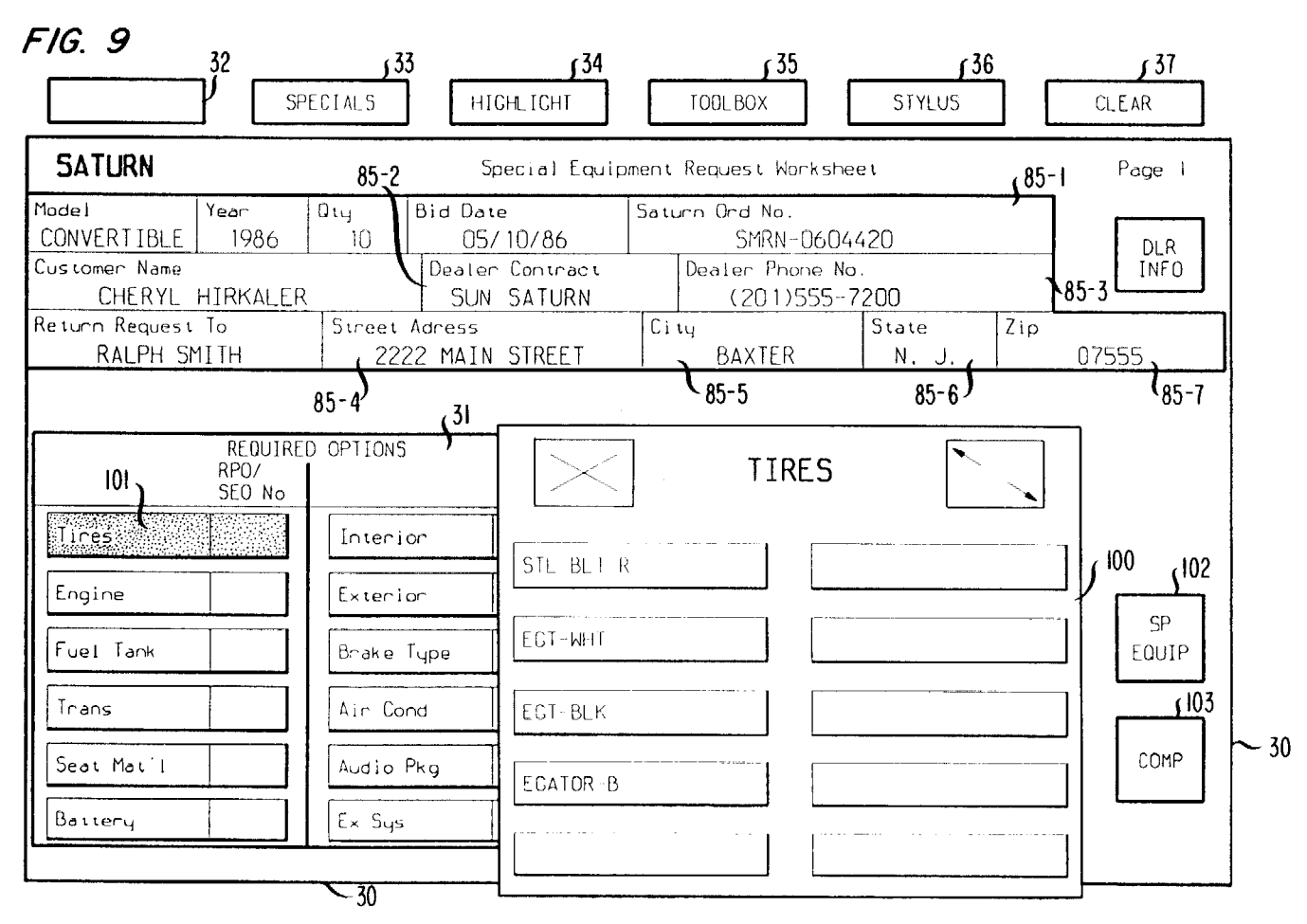

| | SPECIALS | HIGHLIGHT | TOOLBOX | STYLUS | CLEAR |

SATURN — Special Equipment Request Worksheet — Page 1

| Model | Year | Qty | Bid Date | Saturn Ord No. | | DLR INFO |
|---|---|---|---|---|---|---|
| CONVERTIBLE | 1986 | 10 | 05/10/86 | SMRN-0604420 | | |

Customer Name: CHERYL HIRKALER    Dealer Contract: SUN SATURN

Return Request To: RALPH SMITH    Dealer Phone No.: (201)555-7200

Street Adress: 2222 MAIN STREET

City: BAXTER    State: N. J.    Zip: 07555

REQUIRED OPTIONS
RPO/SEO No

| Tires | Interior |
| Engine | Exterior |
| Fuel Tank | Brake Type |
| Trans | Air Cond |
| Seat Mat'l | Audio Pkg |
| Battery | Ex Sys |

TIRES

| ☒ | STL BLTR | | | | |
| | EGT-WHT | | | | |
| | EGT-BLK | | | | |
| | EGATOR-B | | | | |

SP EQUIP

COMP

FIG. 10

(rotated form content)

SATURN — Special Equipment Request Worksheet — Page 2

| Model | Year | Qty | Bid Date | Saturn Ord No. |
| --- | --- | --- | --- | --- |
| CONVERTIBLE | 1986 | 10 | 05/10/86 | SMRN-0604420 |

| Customer Name | Dealer Contract | Dealer Phone No. |
| --- | --- | --- |
| CHERYL HIRKALER | SUN SATURN | (201)555-7200 |

| Return Request To | Street Adress | City | State | Zip |
| --- | --- | --- | --- | --- |
| RALPH SMITH | 2222 MAIN STREET | BAXTER | N. J. | 07555 |

SPECIAL EQUIPMENT ITEMS

Buttons: SPECIALS, HIGHLIGHT, TOOLBOX, STYLUS, CLEAR

RTN — 111
110
30

TOUCH SCREEN FORM ENTRY SYSTEM

FIELD OF THE INVENTION

The invention relates to data entry arrangements.

BACKGROUND OF THE INVENTION

It is well known that such persons as securities traders, sales people, order takers, nurses, etc., spend an appreciable amount of time over the course of a day manually filling in various forms, such as purchase orders, charts, etc. Various techniques have been devised to reduce the amount of time spent filling in such forms. One such technique displays the fields of a form on the cathode ray tube or other display of a computer. A user "fills in" the displayed fields by entering the information called for by each field using the computer keyboard. However, the amount of time that such known techniques save over the manual method of filling in a form is not substantial when a user thereof is not proficient in using a computer keyboard.

SUMMARY OF THE INVENTION

We have recognized that a more desirable approach to providing a computerized form entry system is one that upon displaying a form indicates in a predetermined sequence which of the information fields of the displayed form a user is to fill in and concurrently displays one of a plurality of predefined tools adapted to specifically facilitate the inputting of the information called for by that field. Specifically, in our arrangement, the field that is to be filled in by the user is highlighted and the tool which the user operates to fill in the highlighted field is displayed as an overlay (window) on the form. A tool could be, for example, a calculator, a keyboard, a date pad, etc.

In accordance with one aspect of the invention, the form entry system may be arranged to communicate with illustratively a host computer during the course of filling in a form or chart to obtain the entries for one or more fields thereof. In accordance with another aspect of the invention, one of the displayed fields could be a bit-mapped graphics field which the user fills in by writing on the touch screen using a hand-held stylus. In accordance with another aspect of the invention, the user may erase a displayed tool and bring up another tool and use the other tool to fill in a respective field.

BRIEF DESCRIPTION OF THE DRAWINGS

These and other objects and features, together with the operation and utilization of the present invention, will be more apparent from the illustrative embodiment shown in conjunction with the drawings in which

FIGS. 2 through 10 show various stages of a customized form displayed by the computer arrangement of FIG. 1 in which a field in the form is filled in using a respective displayed tool in accordance with the invention;

FIG. 17 shows the manner in which FIGS. 15 and 16 should be arranged; and

DETAILED DESCRIPTION

Figure 1:
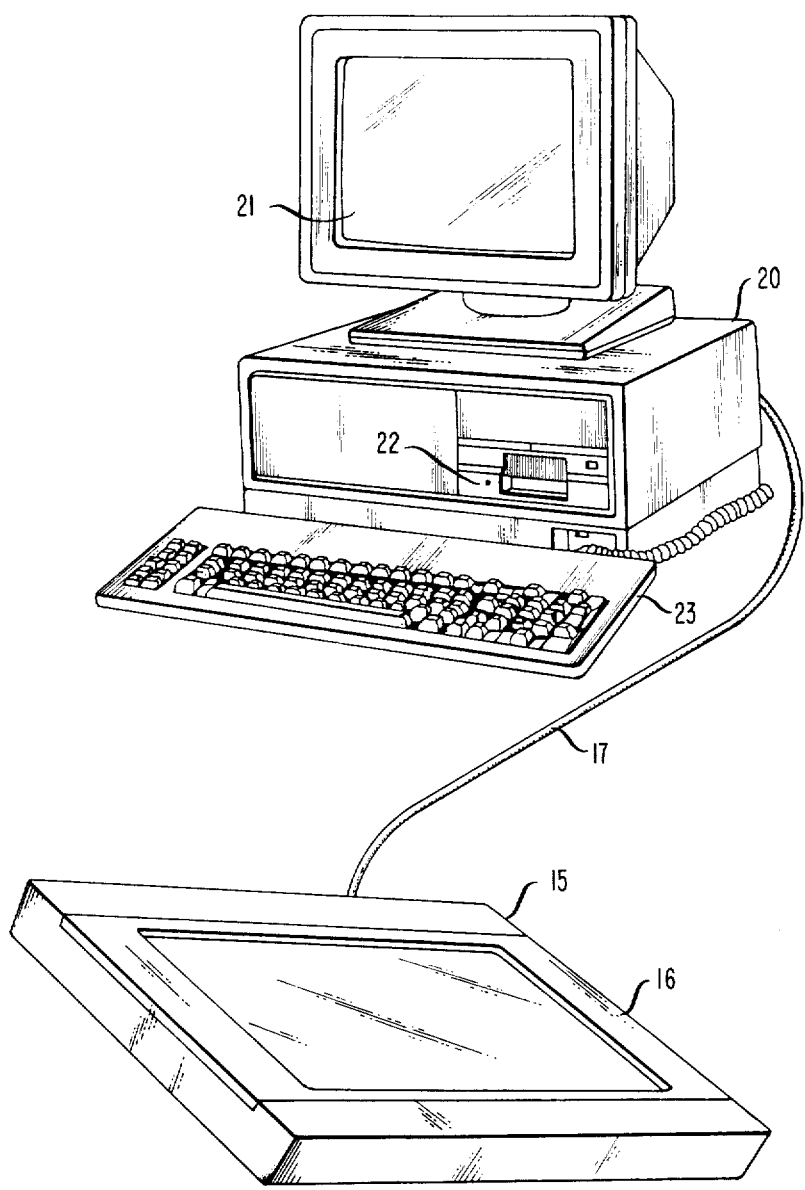
FIG. 1 illustrates a computer arrangement in which the present invention is illustratively implemented.

Form entry system 10 depicted in FIG. 1 includes personal computer 20 and display panel 15. Computer 20 operates under a predetermined operating system—illustratively the MS-DOS operating system. (The MS-DOS operating system is available from Microsoft, Inc.) The computer includes a display 21, keyboard 23 and floppy diskette unit 22 as well as other internal components not explicitly shown in FIG. 1, such as a hard disk unit. The keyboard 23 provides a mechanism for the user to input instructions to the computer, such as an instruction to bring up a predefined screen pattern on display 21. In the practice of the invention, display 21 is not required since any screen pattern that is brought up on display 21 is also brought up on display panel 15.

In particular, panel 15 includes a touch-sensitive screen 16 overlaying a display device, for example, an ac plasma display. The touchsensitive screen could be, for example, the TIX touch-screen available from the Elographics Company of Oak Ridge, Tenn., and the ac plasma display could be, for example, the D0640LB ac plasma display available from DIXY Corporation of Japan. The display 21 and the D0640LB ac plasma display each comprise 400 rows of 640 picture elements (pixels) in each row and therefore, both are suitable for displaying so-called bit-mapped graphics.

Cable 17 includes a multilead bus connected between the ac plasma display and a video (monitor) output port (not shown) available at the back of computer 20. It also includes signal leads connected between touch-sensitive screen 16 and a touch-screen controller circuit board mounted in an available computer 20 circuit board slot (not shown). When touch-screen 16 is touched by the user, the voltage levels appearing on particular signal leads of cable 17 change. The touch-screen controller decodes these changes in the signal levels into x and y coordinates, which define the location that is being touched.

As will be discussed below, a user of the invention may design a customized form for display on panel 15 such that the fields of the form are highlighted one at a time in a particular pattern, such as a sequential pattern. Moreover, the user may associate a predefined tool with a particular field and have that tool displayed as an overlay when the associated field is highlighted. When the user "fills in" a highlighted field using the displayed tool, the system automatically advances to the next field to be filled in, highlights that field and displays the tool that will be used to fill in the field.

Figure 2:
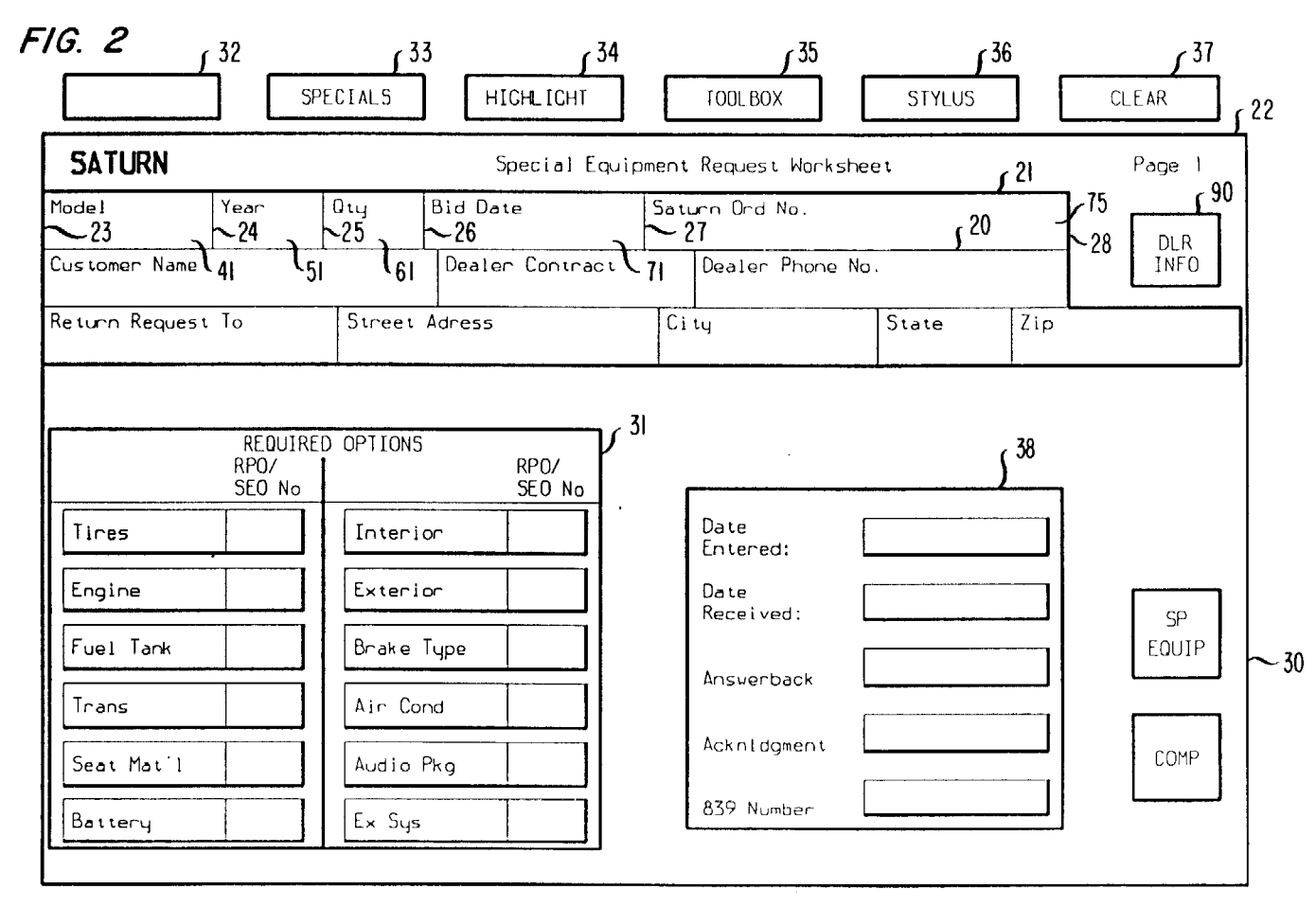

Referring now to FIG. 2, there is shown an illustrative example of a customized form which may be displayed on the ac plasma display of panel 15 after the computer 20 is turned on and has performed some initial tasks including the "booting" of the operating system from the aforementioned hard disk unit, and a screen command identifying the form has been inputted into computer 20 via keyboard 23. Form 30 comprises two pages in which the first page is shown in FIGS. 2-9 and the second page is shown in FIG. 10.

Form 30 is illustratively a customized form for ordering a particular model of automobile from the fictitious Saturn Motor Company (SMC). The form comprises a plurality of information fields each identifying the kind of information to be inserted therein, such as Model, Year, Qty (quantity), etc. The fields, when filled in by a user (e.g., a salesperson), define a particular model of automobile having a particular set of options, the options being filled when the user reaches the options section 31 of the form. Also, special equipment may be ordered when the user points to the box labeled SP EQUIP, as will be discussed below.

(The term "points to" and the variants of that term as used herein is meant to include other terms that are understood by the art and which define similar functions. For example, it includes such notions as moving a screen cursor to the location of displayed text or to an entry in a menu of entries and operating, for example, an enter key; as "touching" the screen as one would touch the touch screen 16 of panel 15; or even as identifying particular displayed text or a menu of entries using terminal buttons, for example, computer keyboard buttons.)

It is seen from FIG. 2 that the fields of form 30 are actually constructed from a plurality of vertical and horizontal lines, such as lines 20, 21, 23, 24 and 25 which define fields 41 and 51 labeled Model and Year, respectively. Function keys 32 through 37 and the manner in which a user specifies the various horizontal and vertical lines to construct the fields of a customized form will be discussed below.

When a form is first brought up on panel 15, one of the fields in the form is illustratively highlighted and, in accordance with the invention, the predefined tool for filling in that field is concurrently displayed illustratively as a window overlaying the form.

Figure 3:
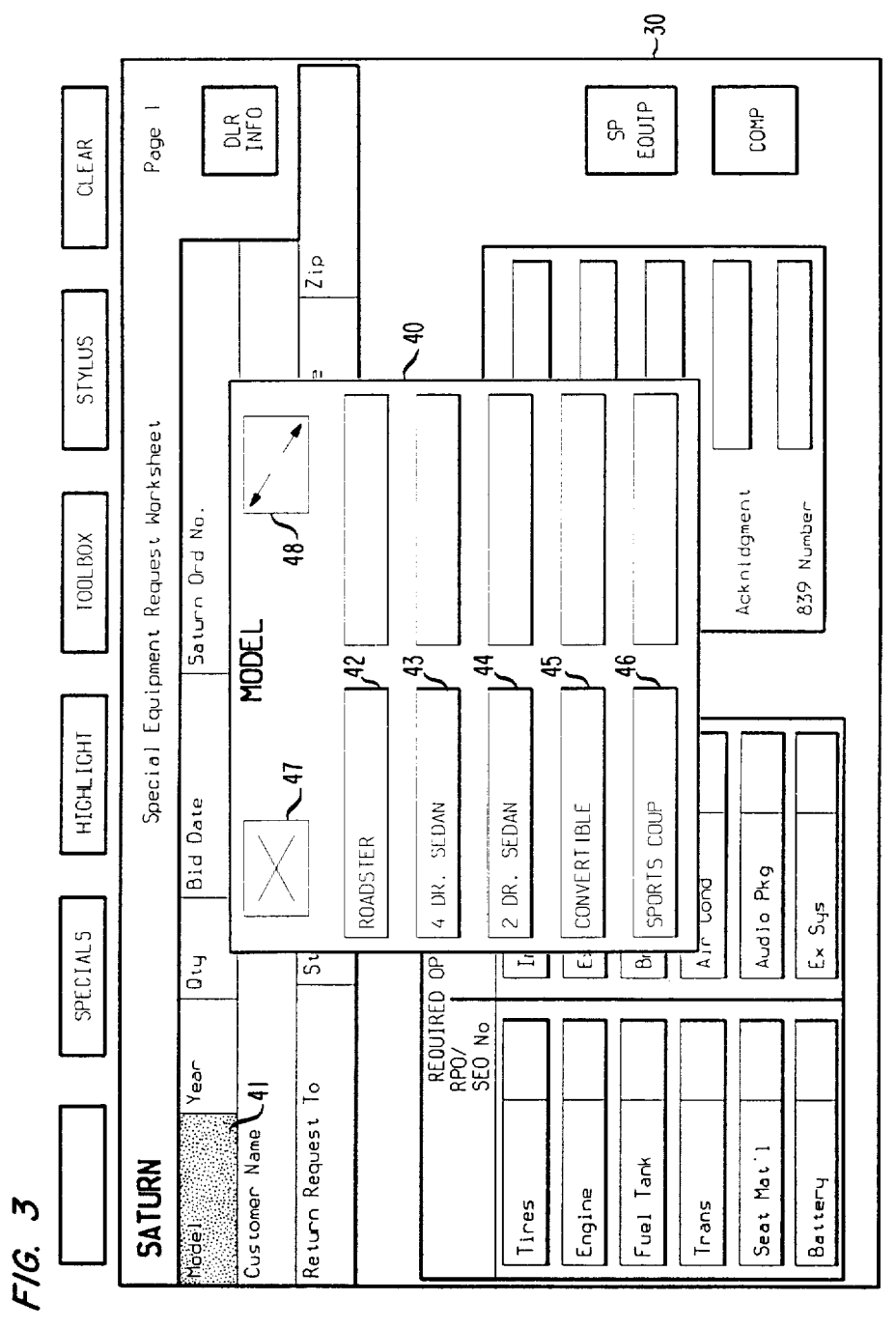

Specifically, FIG. 3 depicts form 30 when it is first brought up on panel 15. It is seen from FIG. 3 that the first field in the form—the Model field 41—is highlighted and the tool 40 for filling in that field is displayed as an overlay (window) on form 30. In this instance, tool 40 is a menu of predefined entries (or items) 42 through 46 representing respective models of automobiles available from SMC. To "fill in" field 41, then, in accordance with a feature of the invention, all that the user needs to do is to point to one of the entries 42 through 46.

(Other functions related to a displayed tool can be invoked by touching tool movement icon 48 or tool erase icon 47, the former allowing the user to move the tool to another location on the display and the latter allowing the user to erase the tool from the display.)

Figure 4:
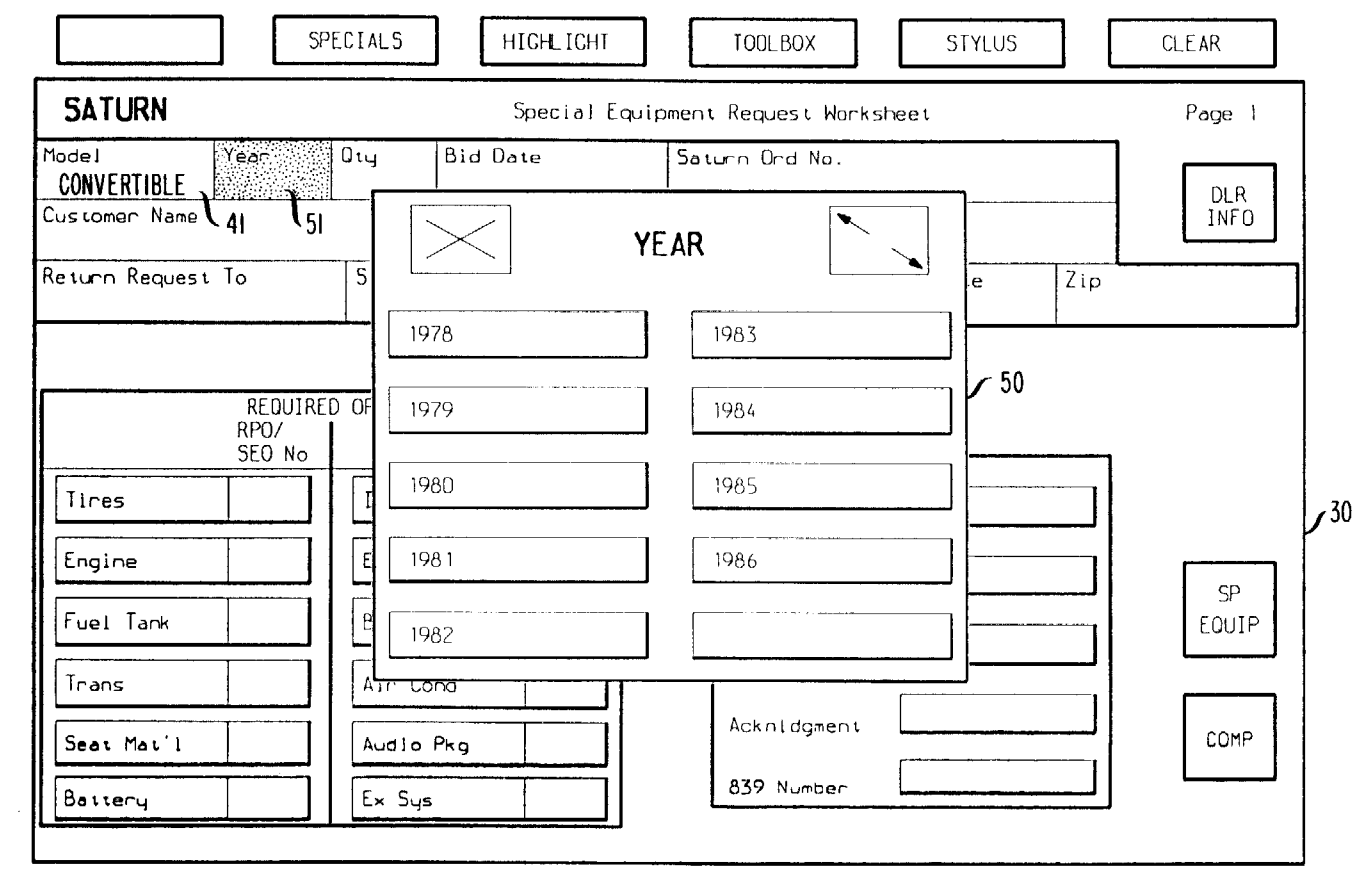

For example, if it is assumed that a purchaser wishes to purchase the CONVERTIBLE model, then the user points to that entry. As shown in FIG. 4, the form entry system, responsive thereto (a) inserts the name CONVERTIBLE in field 41, (b) erases menu 40 from the display of panel 15, (c) highlights the next field—the Year field—and (d) brings up the corresponding tool 50 to fill in that field.

It is assumed for the purpose of illustrating the invention that SMC has an inventory of automobiles that it manufactured during the years 1978 through 1986 and the entries in tool 50 reflect that fact. To fill in field 51, then, all that the user needs to do is to point to one of the entries displayed in tool 50. Assuming that the user selects the entry 1986, the system (a) inserts 1986 in field 51, (b) erases tool 50 from the display, (c) highlights the next field to be filled in, i.e., the Qty field, and (d) displays the tool for filling in that field.

Figure 5:
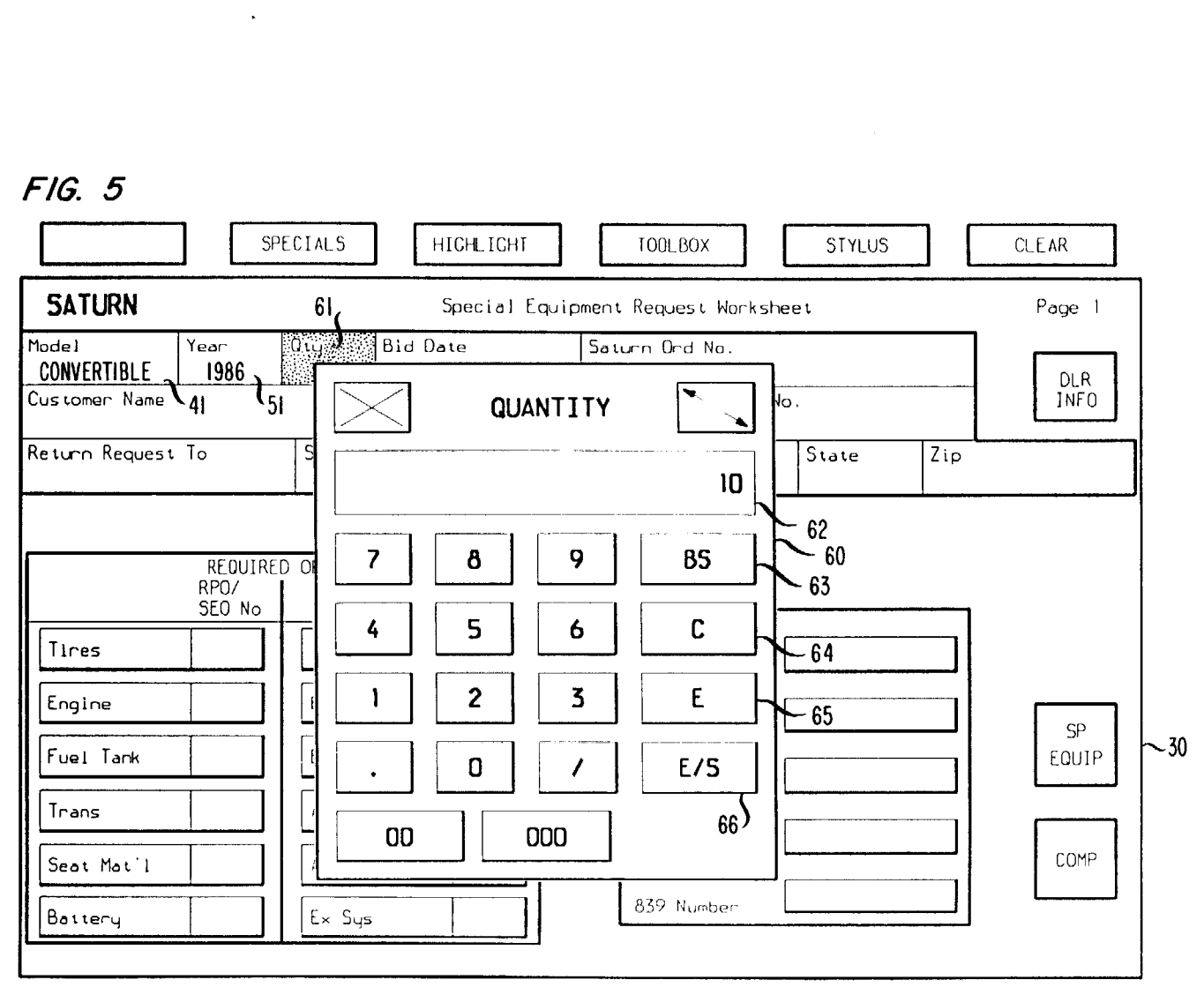

Turning then to FIG. 5, there is shown form 30 at the point where fields 41 and 51 have been filled in and field 61 is highlighted, indicating that field 61 is the next field to be filled in by the user. The device for filling in field 61—number entry tool 60—has also been brought up on the display. The number entry tool 60 operates similar to a standard hand-held calculator in which the user composes a string of numbers by touching individual ones of the displayed buttons of tool 60, for example, the button labeled 0 (zero), as though the user were touching the number buttons on a hand-held calculator or the number buttons on a computer keyboard.

Number entry tool 60 also includes four function keys 63 through 66. Briefly, the BS (back space) key 63 allows the user to backspace to overwrite a digit displayed in the display section 62. The C (clear) key 64 clears the number displayed in display section 62. The E (enter) key 65 allows the user to transfer the number displayed in display section 62 to the highlighted field, i.e., field 61, but the system does not automatically skip, or advance, to the next field to be filled in. To advance to the next field, the user would have to point to it. When the user does so, the system highlights that field (i.e., the Bid Date field) and brings up the tool for filling in the field. The E/S (enter/skip) key 66 causes the system to transfer the number displayed in display section 62 to field 61 and advance to the next field to be filled in.

In the illustrative example of the present invention, it is assumed that the number of automobiles to be ordered is ten. Accordingly, the user touches the digit 1 and 0, respectively, to enter the number 10. In turn, the system displays the digits in the display section 62 of tool 60, as shown in FIG. 6.

Figure 6:
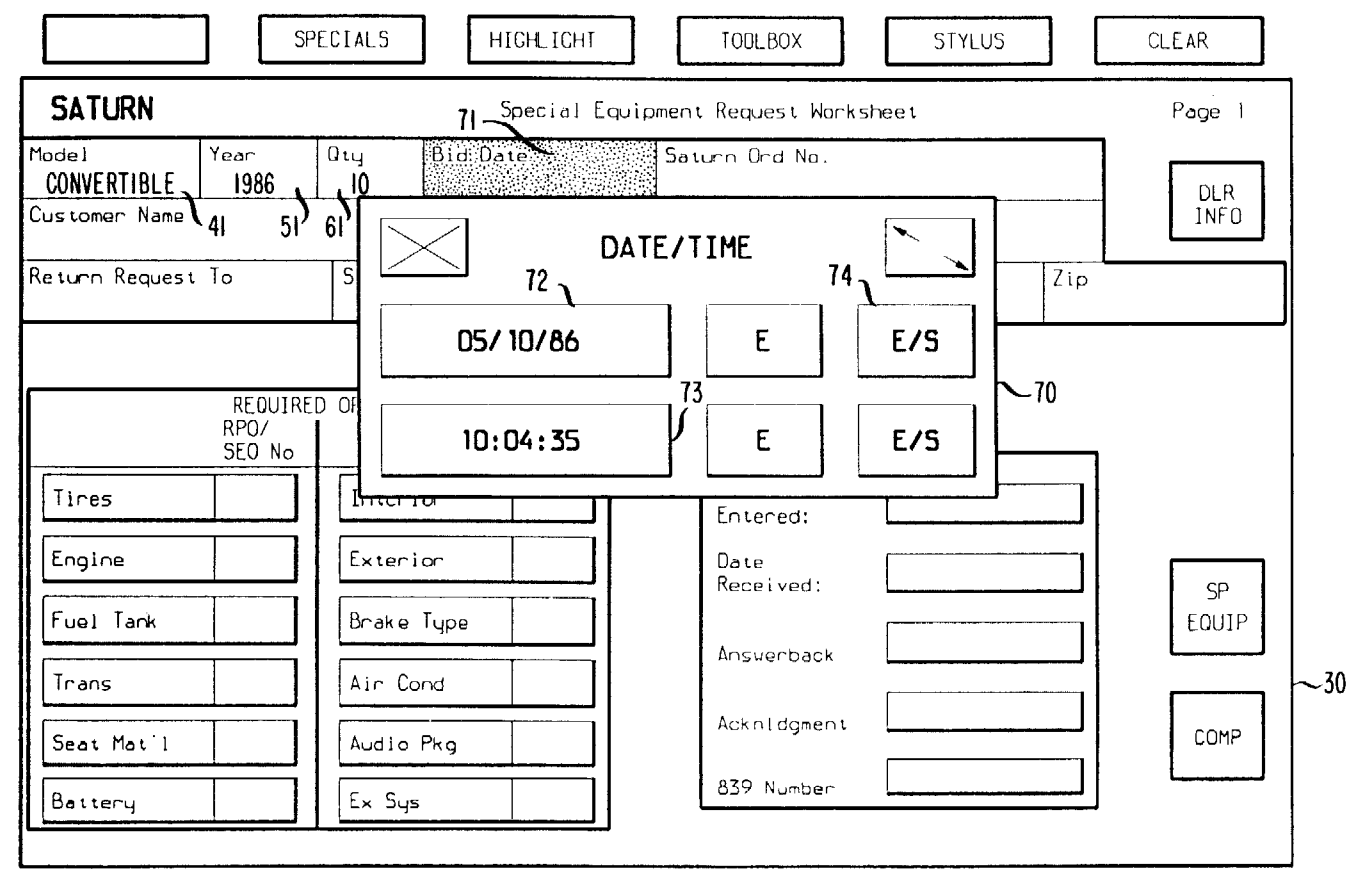

FIG. 6 depicts the result of the user having pointed to the E/S key 66 of tool 60. It is seen that the system has inserted the number 10 in field 61 and has highlighted the Bid Date field 71 to indicate to the user that that field is the next field to be filled in. The system has also brought up the tool 70 for filling in field 71, which, in this case, is a transitory date and time entry tool 70 that is updated periodically. The current date 72 and time 73 displayed in tool 70 are derived from computer 20.

Since the Bid Date field 71 calls for a date and not a time, the user points to the E/S key 74 of tool 70. When the user does so, the system inserts the current date 72 in the associated field 71 and advances to the next field to be filled in.

As will be discussed below, the form entry system of the present invention may be programmed, in accordance with a feature of the invention, to advance to any field in the form. Thus, the system may be programmed, for example, to pass over one or more fields and to return to those fields after the other fields have been filled in.

Figure 7:
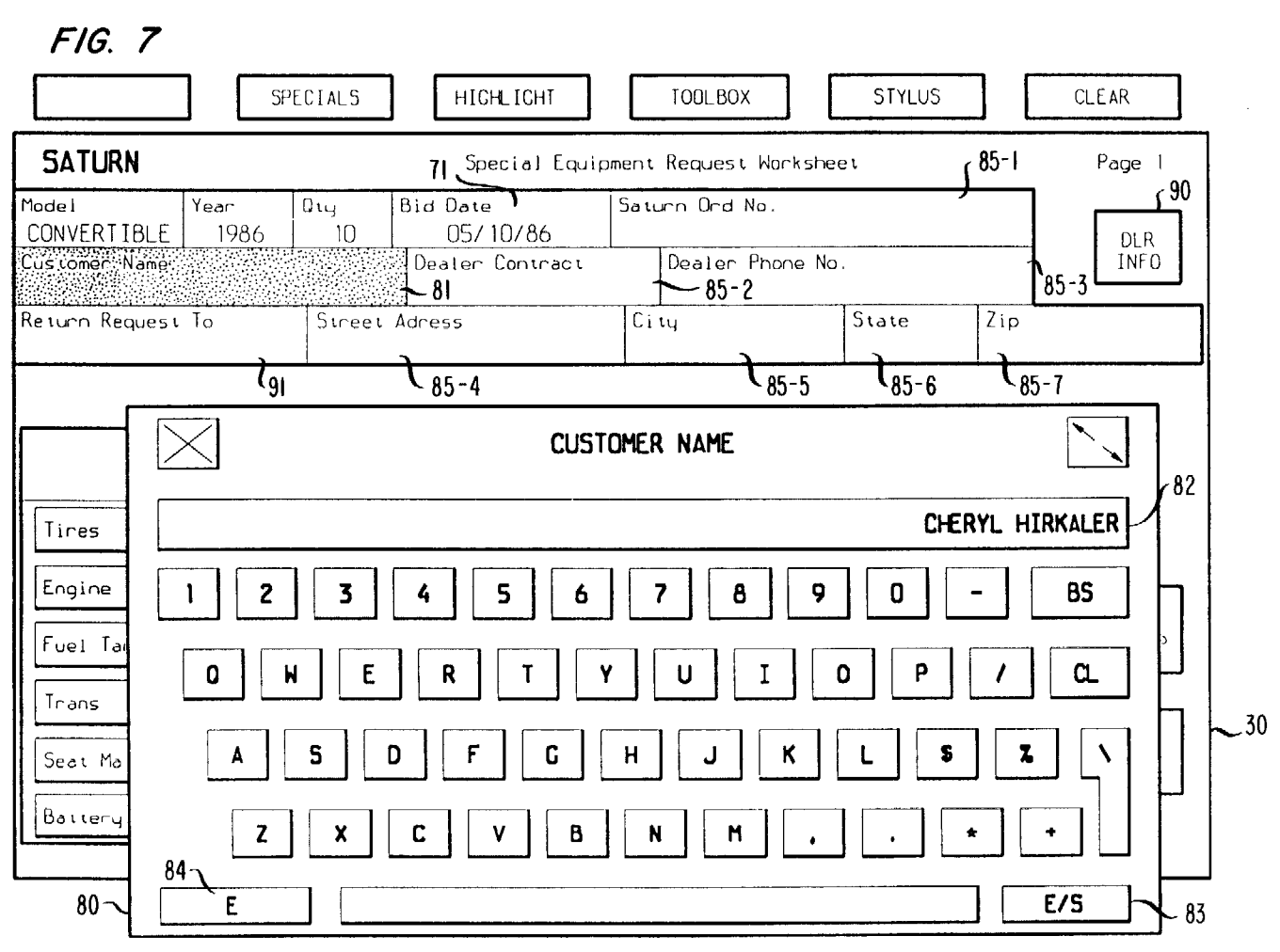

Turning then to FIG. 7, there is shown an example in which the system has been programmed to pass over field 85-1 and highlight field 81. The system has also brought up keyboard tool 80, since field 81 calls for the insertion of a name.

Specifically, tool 80 is patterned after a conventional keyboard having a display section 82. The user may illustratively compose a name by pointing to respective ones of the displayed keys of tool 80. When the user touches a key, for example, the key labeled C, the system displays that letter in display section 82 of tool 80. Upon composing the customer's name and seeing it displayed in display section 82, as shown in FIG. 7, the user then enters the name in the associated field 81 by pointing to the E/S key 83.

At this point in the discussion, it is assumed that, upon filling in field 81, the system is programmed to skip over fields 85-2 and 85-3 and advance to the Return Request To field 91. When the system advances to field 91, it highlights that field and brings up the corresponding tool for filling in the field, such as a menu of names (not shown). In the present illustrative example of the invention, when the user selects one of the names in the displayed menu of names, the system inserts the selected name in field 91 and advances to DLR INFO 90.

In certain instances, it may be advantageous to allow a central location, such as a host computer, to determine the information that is to be inserted in a field of a form. For example, a unique number is typically printed on each copy of a printed form to distinguish one copy of the form from another copy. The preprinted form number thus prevents the same number from being used on more than one copy of the form, which may not be ensured if the person who is filling in the form also fills in the form number, since the person could mistakenly write the same number on more than one copy.

Also, in certain instances, the same information may be inserted in a particular field(s) of a form each time a copy of the form is filled in, such information being, for example, the phone number of the dealer inserted in field 85-3.

In accordance with a feature of the invention, the form entry system may be programmed to communicate with other equipment, such as a host computer, via an application program to obtain information for filling in one or more fields of a form, such as fields 85-1 through 85-7.

Turning then to FIG. 8, there is shown form 30 with DLR INFO 90 highlighted. In this instance, DLR INFO 90 provides the function of a "button" rather than a field. When the user touches button 90, computer 20 communicates with a host computer via an application program (discussed below) to obtain the information for filling in fields 85-1 through 85-7. Upon obtaining such information, the system automatically (a) inserts it in fields 85-1 through 85-7, (b) removes the highlighting at button 90 and (c) advances to the option section 31 of the form, as shown in FIG. 9.

It is seen from FIG. 9 that the system, in advancing to option section 31, has highlighted field 101 and has brought up tool 100 comprising a menu of alternatives which the user operates to fill in that field in the manner as discussed above. The remaining fields of section 31, i.e., the fields labeled Engine through Ex Sys, are filled in by the user as each of those fields is highlighted and the respective tool is displayed.

It is assumed at this point in the discussion that page 1 of form 30 has been filled in and the system has highlighted the SP EQUIP (special equipment) button 102. When the user points to button 102, the system erases page 1 of form 30 and displays page 2 of form 30, as shown in FIG. 10.

It is seen from FIG. 10 that the fields in the top section of page 2 and the fields in the top section of page 1 of form 30 are identical. Accordingly, the system, upon bringing up page 2 of the form, automatically fills in those fields using the information inserted in the corresponding fields of page 1. In bringing up page 2, the system also highlights field 110 of form 30.

Specifically, field 110 is, in accordance with a feature of the invention, a bit-mapped graphics field which permits the user to "write in" instructions in the field. These instructions may be, illustratively, special equipment items to be ordered from SMC. Other instructions, such as the method of delivering the automobiles to the purchaser, may also be written in field 110 as well as the signature of the person filling in form 30. In the present example of the invention, the special equipment item called "cruise control" is being ordered. Accordingly, the user writes in the name of that item in field 110. In turn, the system tracks the points on touch screen 16 that is being touched by the stylus and illuminates the corresponding points on the ac plasma display of panel 15, thereby tracking the user's handwriting. Upon filling in field 110, the user touches the RTN (return) button 111. When the user does so, the system erases page 2 and redisplays page 1 of form 30.

Page 1 of form 30 includes a COMP (complete) button 103, as shown in FIG. 9. Upon filling in the form, the user touches button 103. In response thereto, the system illustratively (a) stores the various field entries in a so-called hand-off file, (b) erases form 30 from the display and brings up a fresh form 30, as shown in FIG. 3, and (c) passes the hand-off file to the host computer for processing.

Other functions related to either filling in form 30 or creating a customized form can be invoked, or selected, by pointing to, i.e., touching, individual ones of the function keys 32 through 37 displayed along the top of form 30, as shown in FIG. 9. Briefly, key 32 is blank and available for future use, such future use being, for example, an edit key which causes a menu of editing functions to be displayed when the user touches key 32. The SPECIALS key 33 provides two functions, the first function allowing the user to store a customized form in hard disk, and the second function allowing the user to calibrate a touch point on touch screen 16 with either the ac plasma display of panel 15 or display 21 of computer 20 if the touch screen happens to be overlaying the latter display. The HIGHLIGHT key 34 allows the user to change the contrast of form 30 when it is being displayed from light to dark or vice-versa. The TOOLBOX key 35 displays a menu of predefined "tools" as will be discussed below. The STYLUS key 36 changes the style of handwriting displayed in a bit-mapped graphics field of form 30 to either fine or bold point writing. The CLEAR key 37 allows the user to either clear one or all of the filled in fields of a displayed form.

In certain instances the tool that the system brings up for filling in a corresponding field may be out of date. For example, assume that SMC adds a new tire to its product line and that the tool 100, shown in FIG. 9, has not been updated to include the new tire as an option. Thus, tool 100 could not be used to fill in field 101 if the new tire is the selected option. This problem is dealt with, in accordance with a feature of the invention, by allowing the user to bring up another tool, such as the keyboard shown in FIG. 7, and use that tool to fill in field 101. The user brings up the keyboard by first touching the erase icon of the displayed tool, which erases the displayed tool, and then touching the toolbox function key 35, which displays a menu of predefined tools.

Figure 11:
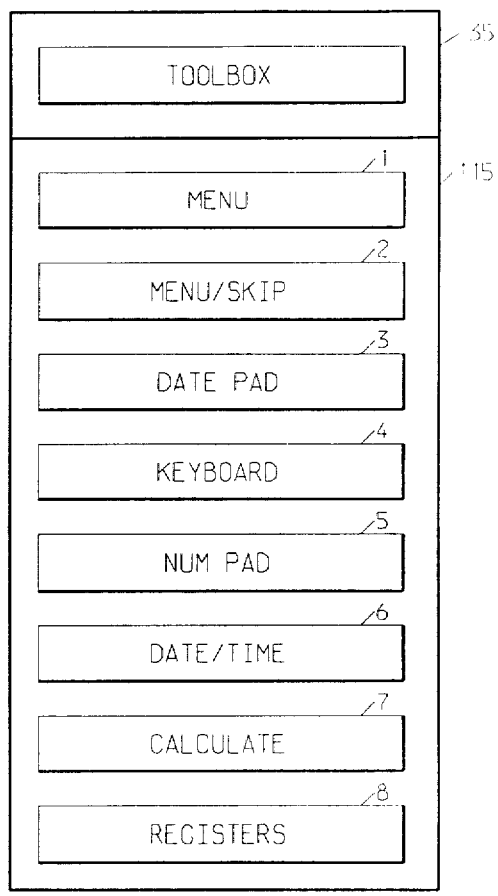
FIG. 11 depicts a menu of predefined tools that is displayed by the computer arrangement of FIG. 1 when a user points to a respective one of the function keys shown in FIGS. 2 through 10.

Turning then to FIG. 11, there is shown the menu 115 of predefined tools that is displayed as an overlay when the user touches function key 35. The user may redisplay the tool that was erased from the screen by touching the corresponding one of the tools 1 through 8. For example, tool 100 (shown in FIG. 9) is redisplayed by touching menu item 1 and is redisplayed with an E/S button if menu item 2 is touched. In particular, the user may bring up either the keyboard tool 80 (shown in FIG. 7), the number pad tool 60 (shown in FIG. 5) or the date and time tool 70 (shown in FIG. 6) by touching either menu item 4, 5 or 6, respectively. The user may bring up a date pad tool (not shown) by touching item 3. The date pad that is brought up on the display has a format that is similar to the format of number pad 60 and is used to insert a date in a field when the date to be inserted is not the current date. The user may bring up a calculator tool (not shown) by touching item 7. The calculator tool is similar in appearance to a conventional hand-held calculator and includes four registers. The user operates the displayed calculator as though the user was operating a hand-held calculator. The user may also bring up the four calculator registers (not shown) without bringing up the calculator by touching menu item 8.

The foregoing was discussed in terms of displaying a customized form and the tools that are used to enter data in the fields of the form. Alternatively, the present invention may be adapted to bring up a tool which is used to perform a specific function other than inserting data in a field.

Figure 12:
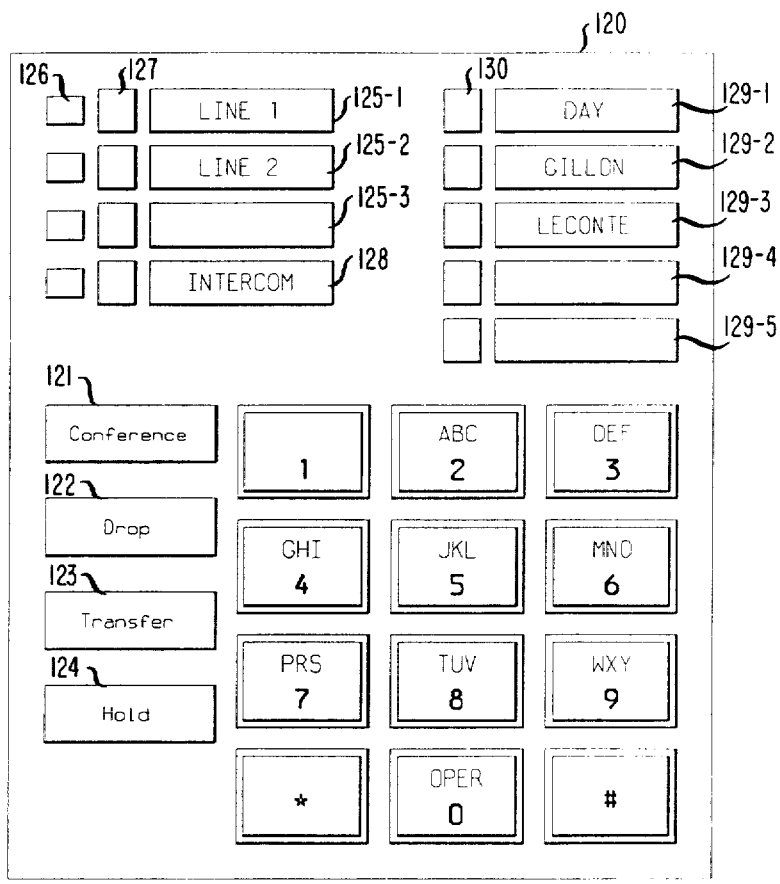
FIG. 12 shows a telephone station set tool which may be displayed by the computer arrangement of FIG. 1 to establish a telephone call.

For example, FIG. 12 shows tool 120 which is patterned after a telephone station set and which may be brought up on panel 15 when the latter is connected to a computer having the capability to establish a telephone connection, such as the AT&T UNIX PC 7300. Specifically, the buttons bearing the labels 1 through 0, * and # represent telephone buttons which the user touches as though he or she were touching the similarly labeled buttons on a conventional telephone station set to dial in a telephone number. Included in telephone tool 120 are buttons 121 through 124 which are used to invoke well-known telephone features. For example, Conference button 121 is used to establish a conference call, Drop button 122 is used to terminate a call, Transfer button 123 is used to transfer a call to another station or computer and Hold button 124 is used to place a call on hold. Telephone tool 120 also includes fields 125-1 through 125-3 which display the status of respective telephone lines connected to the computer. FIG. 12 shows two such telephone lines—Line 1 and Line 2—in fields 125-1 and 125-2, respectively. Field 125-3 is shown blank to indicate that it is reserved for a third telephone line not yet connected to the computer. Each of the fields 125-1 through 125-3 has associated therewith two other fields, such as fields 126 and 127, to simulate the functions performed by the well-known in-use lamps that are found on conventional business telephone station sets. For example, field 126 represents the red in-use lamp and is highlighted to indicate to the user that line 1 is the line that will be used (or is being used) when placing a telephone call. It is noted that the computer will typically select line 1 and will place that line in the off-hook state when tool 120 is brought up on the display. The user may select line 2 by touching field 125-2, in which case, the computer places line 1 in the on-hook state if a call has not been established over that line and places line 2 in the off-hook state.

Field 127 represents the green in-use lamp and is highlighted to indicate to the user that the associated line is active. The field is also placed in a flashing mode by highlighting and removing the highlighting from the field to indicate that a call is being received over the associated line.

Field 128 represents an intercom button which is highlighted when the user touches field 128. In that event, the computer connects the user to an intecom line. Fields 129-1 through 129-5 represent the well-known one-touch dialing buttons that are found on conventional station sets. For example, if the user wishes to place a telephone call to the person named in field 129-1, i.e., DAY, then all the user needs to do is touch that field rather than dialing the person's telephone number using the displayed telephone keypad.

In operation, when tool 120 is brought up, fields 126 and 127 are highlighted indicating that line 1 is the active line. When the user touches one of the digits of the displayed keypad, for example, the digit labeled 2, the form entry system passes the coordinates of the touch point to an application program, as will be discussed below. The application program, in turn, causes the computer to outpulse the digit over line 1, line 1 and line 2 being connected to, for example, a telephone company central office. The form entry system operating in conjunction with the application program handles the remaining digits touched by the user in the same fashion to establish a telephone connection to the desired telephone number.

According to a feature of the invention, the user may design his or her own customized form for a particular application. In designing such a form the user specifies, using various commands, where on the screen the rectangles (fields), lines, text and graphic images should be placed, such commands being stored in a screen file as they are being inputted by the user via keyboard 23 of computer 20 (FIG.1). The user also specifies the attributes of each field, i.e., the highlighting of the field, the tool that is brought up when the field is highlighted, the next field that is highlighted when the current field is filled in, etc., as will be discussed below. In discussing the design of a form, reference will be made to FIG. 2.

Returning then to FIG. 2, it is noted that function keys 32 through 37 are typically displayed regardless of which form or tool is brought up, function keys 32 through 37 being displayed over illustratively the first 30 rows of pixels. Thus, the beginning (upper left-hand corner) of form 30 starts at row 31 of the display. It is seen from FIG. 2, that a demarcation between form 30 and keys 32 through 37 is established by the bold line 22. A line in a form, such as line 22, may be specified using illustratively a line command as follows:

putline(x1,y1,x2,y2,linewidth)

where x1 and y1 are the horizontal and vertical coordinates (row and column) of one endpoint of the line, x2 and y2 are the coordinates of the other endpoint of the line and linewidth is the thickness of the line, in pixels, and is restricted to 1, 2 or 3, such as the thickness of lines 20, 21 and 22, respectively. Accordingly, the command that is inputted to display line 22 is as follows:

putline(31,3,31,635,3)

(It is noted that the putline command may also be used to bring up a diagonal line by specifying the coordinates of the endpoints of the line.)

A horizontal line may be displayed using illustratively the command, puthline(x,y,length,linewidth)

where x and y are the coordinates of the upper-left-most pixel of the line and length is the length of the line in pixels. Thus, line 22 may also be inputted as follows:

puthline(31,3,635,3)

A vertical line may be displayed using illustratively the command, putvline(x,y,length,linewidth)

where length in this case is the height (number of rows) of the vertical line.

Text may be inserted in a form using illustratively a text command as follows:

puttext1(x,yh,font,"text")

where x is the horizontal coordinate of the location of where the text is to being, yh is the top pixel of the text string, font specifies the type of font to be used (for example, the type of font that is used to spell out "SATURN", "Model" or "Required Options" shown in FIG. 1), and text is the string of text to be displayed. Thus, the user inputs the following commands to display the text that is shown across the the top of form 30:

puttext1(28,37,9,"SATURN")

puttext1(250,37,1"Special Equipment Worksheet Page 1")

The following sequence of commands establishes the first set of fields of form 30; namely, the Model, Year, Qty, Bid Date and Saturn Ord. fields:

| | |
|---|---|
| puthline(3,60,537,2); | (1) |
| putvline(3,60,105,2); | (2) |
| puttext1(15,65,1,"Model"); | (3) |
| putvline(95,60,35,1); | (4) |
| puttext1(98,65,1,"Year"); | (5) |
| putvline(135,60,35,1); | (6) |
| puttext1(138,65,1,"Qty"); | (7) |
| putvline(190,60,35,1); | (8) |
| puttext1(193,65,1,"Bid date") | (9) |
| putvline(325,60,35,1); | (10) |
| puttext1(328,65,1,"Saturn Ord. No.") | (11) |
| putvline(540,60,70,2); | (12) |
| puthline(3,95,537,1); | (13) |

Of the above commands the first command (1) displays horizontal line 22, commands 2, 4, 6, 8, 10 and 12 display vertical lines 23 through 28, commands 3, 5, 7, 9 and 11 display the labels for those fields, respectively, and command 13 displays line 20.

A field may also be displayed on a display using a command which displays a rectangle. For example, either of the following commands may be used to draw any size rectangle, anywhere on the display:

putrect1(x1,y1,width,height,linewidth)

putrect2(x1,y1,x2,y2,linewidth)

Where x1 and y1 are the horizontal and vertical coordinates of the upper left corner of the rectangle, respectively, x2 and y2 are the horizontal and vertical coordinates of the lower right corner of the rectangle, respectively, width and height are the width and height (including the border lines) of the rectangle, respectively, and linewidth is the width in pixels of the border around the rectangle. Thus, a rectangular field and the text identifying the field, such as button 90, may be drawn on the display as follows:

putrect1(565,75,55,50,2)

puttext1(576,85,2,"DLR")

puttext1(574,103,2,"INFO")

Once the form designer has completed the layout of the fields of the desired form using the above mentioned commands, he or she then specifies the attributes of the fields, i.e., the highlighting of the respective field, which tool is brought up when the field is highlighted, which field is next highlighted after the field is "filled in", etc.

In particular, either of the following commands specify the highlighting of a field:

deflite1(litenum,x1,y1,width,height)

deflite2(litenum,x1,y1,x2,y2)

where litenum is an integer which uniquely identifies the area to be highlighted, x1 and y1 are the horizontal and vertical coordinates of the upper left corner of the highlighted area, respectively, width and height are the width and height of the highlighted area, respectively and x2 and y2 are the horizontal and vertical coordinates of the lower right corner of the highlight area, respectively. For example, fields 41, 51, 61, 71 and 75 are highlighted by inputting the following commands:

deflite1(1,3,60,92,35);

deflite1(2,95,60,39,35);

deflite1(3,135,60,54,35);

deflite1(5,190,60,135,35);

deflite1(10,325,60,214,35);

The other attributes of a field may be specified using, for example, the following command:

deffld1(fldnum,"fldname",x1,y1,width,height,type,
  litenum,autotool,xtool,ytool,autoskip,enable,
  keygroup,font,valid,vmin,vmax);

Where fldnum is an integer uniquely identifying the respective field; fldname is the name (label) displayed on the corresponding tool that is specified in the "autotool" field of the command and is the name that is used when the system displays validation errors; x1 and y1 are the horizontal and vertical coordinates of the upper left corner of the field; respectively; width and height are the width and height of the respective field; type is the field type, such as a bit-mapped-graphics field or an ASCII text area; litenum is the number of the associated highlighted area, mentioned above; autotool identifies the particular tool that is displayed when the field is highlighted, for example, the values 1 through 8 are used to specify the predefined tools shown in FIG. 11, respectively, the value 0 is used to signify a null state, i.e., no tool; xtool and ytool are the horizontal and vertical coordinates of the upper left corner of the tool to be displayed; autoskip is the number of the next field to be highlighted; enable is the field number (if any) of another key field which must be activated before current field can be activated; font is the type of font to be used when inserting the entry in the respective field; valid is an indication of whether a validation is to be done on the selected entry before it is entered in the field, for example, validating a date that is to be entered in the field, vmin and vmax specify the range of the validation, such as whether a number falls within the range of vmin and vmax.

The attributes of, for example, fields 41 and 51 of form 30, may be specified (inputted) as follows:

deffld1(1,"MODEL",15,82,79,12,4,1,2,175,100,2,
  0,0,0,0,0,0);

deffld1(2,"YEAR",101,82,33,12,4,2,2,175,100,3,
  0,0,0,0,0,0);

(It is noted that the attributes of a field may be specified using, alternatively, a deffld2 command, the format of the deffld2 being similar to the format of the deffld1 command.)

The following command may be used to specify which field is to be highlighted when illustratively a form is first displayed:

defstart (fldnum);

where fldnum is defined above in connection with defining the deffld1 command.

We turn now to the hardware and software which implement the present illustrative embodiment of the invention.

Figure 13:
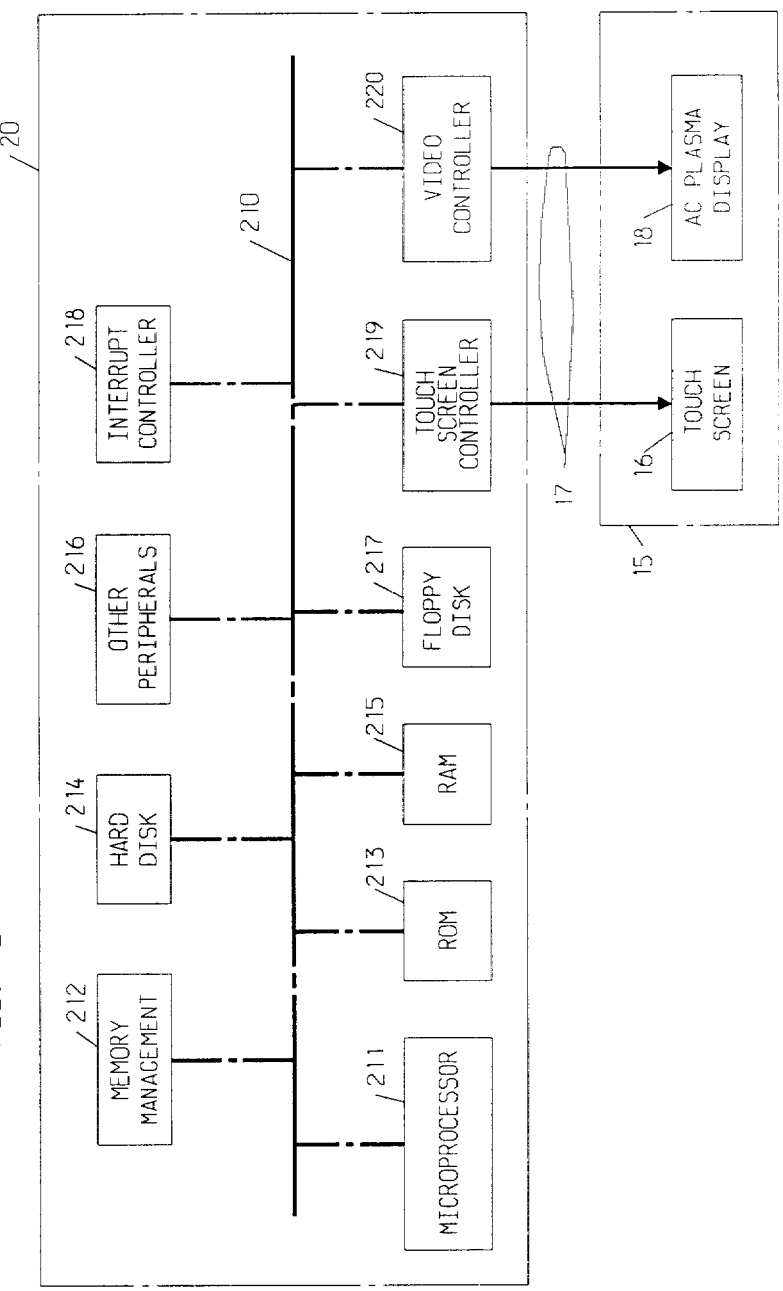
FIG. 13 is a simplified block diagram of the computer arrangement of FIG. 1.

FIG. 13 is a simplified block diagram of computer 20. At the heart of the computer is a microprocessor 211 which communicates with its peripherals via a bus 210. These peripherals include ROM 213, RAM 215, memory management circuitry 212, hard and floppy disk units 214 and 217, respectively, interrupt controller 218, video controller 220 and various other peripherals denoted collectively at 216. As mentioned above, touch screen controller 219 is used to determine the x and y coordinates of a location on touch screen 16 that is being touched by the user.

Specifically, touch screen 16 of panel 15 comprises a glass plate with a transparent resistive coating that is fired onto the active side of the glass plate at a high temperature to provide a voltage divider. A mylar contact sheet is stretched over the glass substrate and is held above the resistive coating by separator points. Finger or stylus pressure causes the mylar cover sheet to deform and make electrical contact with the resistive coating at the point of touch. Controller 219, which can be, for example, the Elographics E271-101 controller, periodically impresses a voltage gradient across the resistive coating on the glass plate via a pair of leads of cable 17. The voltage gradient is alternately applied between the x and y directions to obtain voltages which are analog representations of the coordinates of the location on touch screen 16 that is being touched by the user. These analog voltages are digitized by controller 219 and transmitted to microcomputer 211 for processing.

Ac plasma display 18 of panel 15 is composed of multiple rows and columns (400×640) of individual gas cells (pixels), formed at the intersection of a cover glass and two (addressing and common sustain) parallel substrate electrodes. The control circuitry (not shown) upon receiving digital video signals from controller 220 ignites individual gas pixels to form a pattern on display 18, such as the screens depicted in FIGS. 2 through 12. To illuminate a pixel on display 18, a neon-argon gas mixture within the corresponding cell is excited by applying a high voltage potential across the the cover glass electrode and addressing substrate electrode, thereby causing the gas mixture to become ionized and emit light. Ionization is sustained by transferring the electrical charge from the cover glass electrode to the common sustain substrate electrode. The pattern brought up on display 18 is erased by removing the sustaining voltage from the common sustain substrate electrode.

Figure 14:
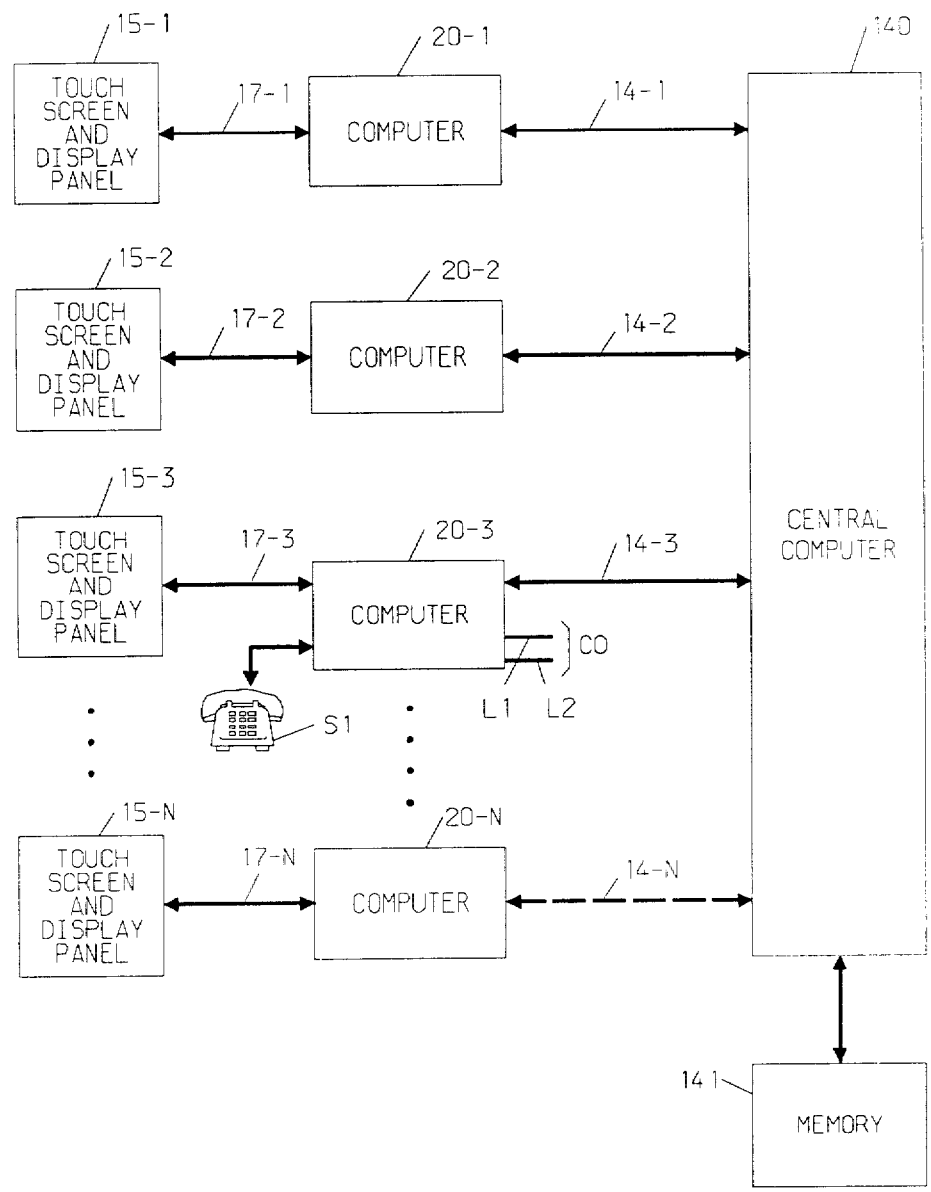
FIG. 14 is a simplified block diagram showing a central computer connected to a plurality of other computers, such as the computer depicted in FIG. 1, the computers, in turn, being shown connected to respective display panels.

FIG. 14 is a simplified block diagram of central (host) computer 140 and a plurality of computers 20-1 through 20-N. Computer 140 is a multiserver computer, such as Digital Equipment Corporation's VAX-11/780 operating under, for example, the UNIX operating system, and having stored therein, such as in memory 141, the earlier mentioned handoff files that it receives from respective ones of computers 20-1 through 20-N. Also stored in memory 141 are the entries that are inserted in illustratively fields 85-1 through 85-7 of form 30, as discussed above.

Each of the computers 20-1 through 20-N can be either a personal computer, such as computer 20, workstation, or another VAX11/780. Computers 20-1 through 20-N communicate with computer 140 over respective bidirectional communication paths 14-1 through 14-N. Such communication paths can be either a hard-wired connection, a telephone line, or a local area network, the latter being represented by dashed line 14-N. It is seen that computer 20-3 also has two telephone lines L1 and L2 connected to it. Lines L1 and L2, in turn, connect to a telephone company central office (CO) so that computer 20-3 can establish a telephone connection between telephone station set S1 and the central office when it is directed to do so by a user using station set tool 120 shown in FIG. 12.

Each of the computers 20-1 through 20-N is arranged to implement the invention and each is connected to a respective touch screen and display panel 15-1 through 15-N via respective cables 17-1 through 17-N. In the practice of the invention, each of the computers 20-1 through 20-N may be arranged to bring up the same form, such as form 30 discussed above, different pages of a form, different customized forms, or different customized tools, in which a customized tool performs a specific function, as discussed above.

As mentioned above, a form may be displayed via an application program designed by the user. The application program may be, for example, a program which firsts displays, for example, instructions to the user, erases the instructions and then directs the form entry system to bring up a particular form. It could also be a program which controls the display of a series of forms or pages of a form, such as page 1 and page 2 of form 30, discussed above. The application program could also be a program which responds to user inputs when, for example, the station set tool of FIG. 12 is displayed on either panel 15 or display 21.

Figure 15:
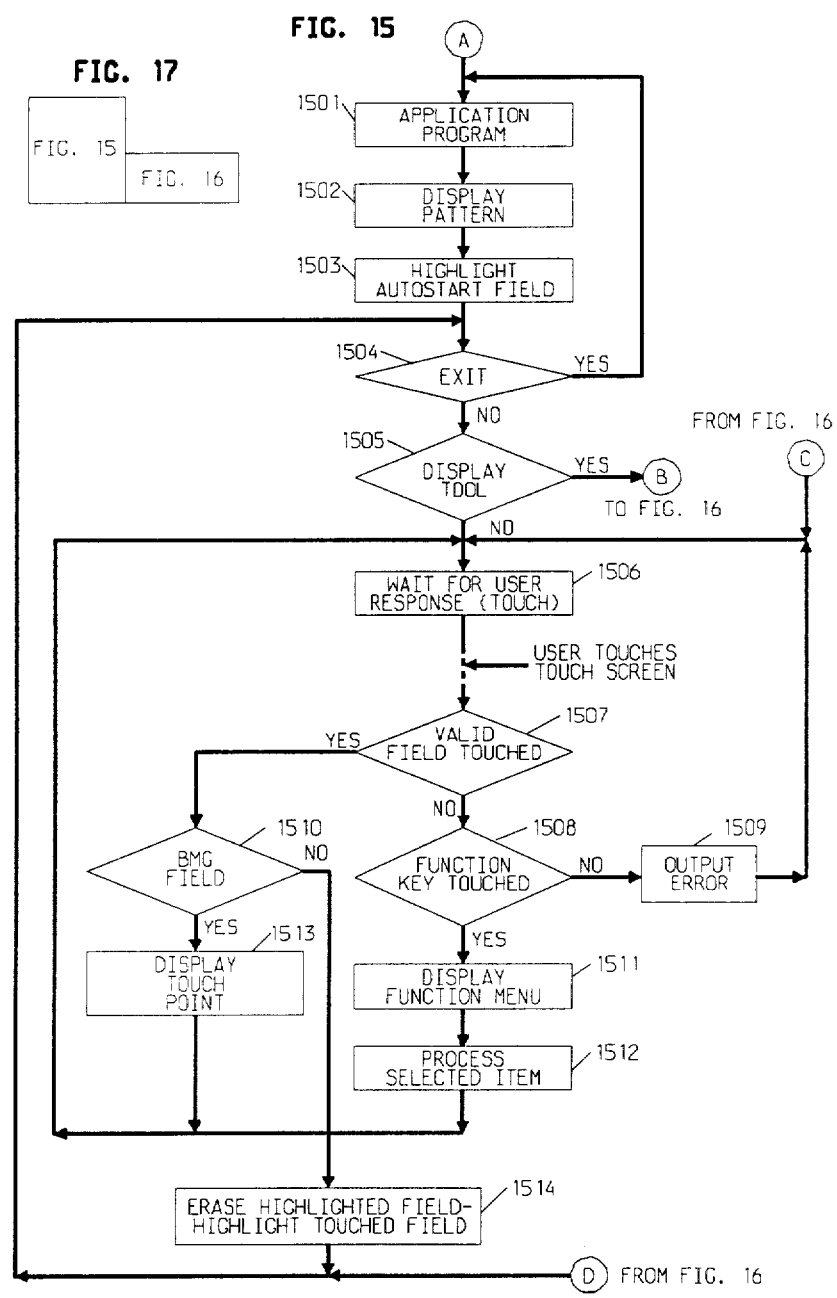
FIGS. 15 and 16 are flowcharts describing the operation of the computer arrangement of FIG. 1 in relation to, inter alia, filling in the form of FIGS. 2 through 10, in accordance with the invention.
Figure 16:
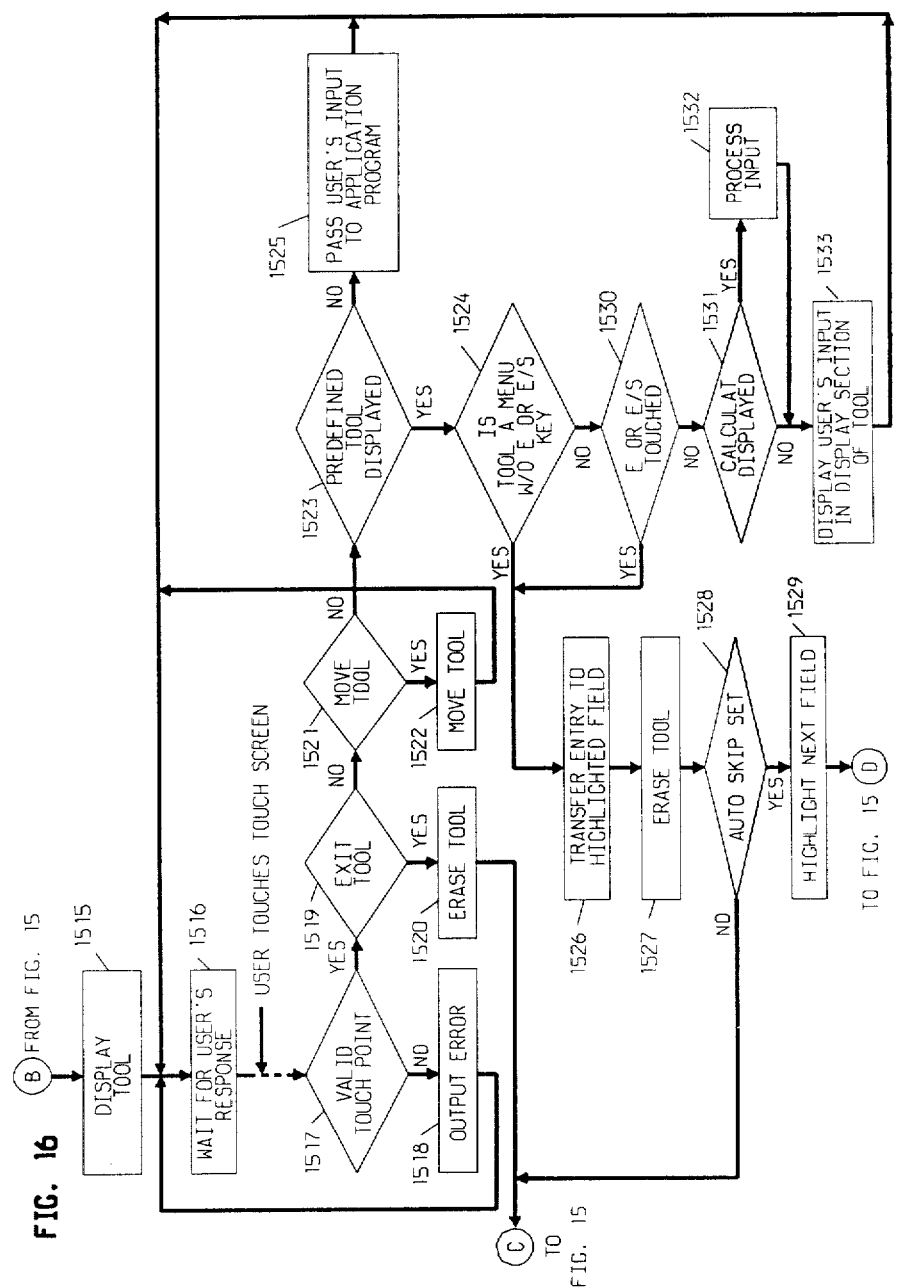

Turning then to FIGS. 15 and 16, there is shown a flowchart of an application program, as represented by block 1501, and the form entry system program, as represented by blocks 1502 through 1533. FIGS. 15 and 16 should be arranged as shown in FIG. 17. Hereinafter the form entry system program will be referred to as the program. It is assumed that the application program at block 1501 is arranged to pass the name of a file containing the commands for displaying a customized form to block 1502. Upon receiving the name of the file, the program at block 1502 executes the commands contained in the file, the commands being, for example, the above mentioned puthline, putvline and puttext commands. The program then proceeds to block 1503 where it scans the file for a defstart command. If the file contains a defstart command, the program executes the command and then proceeds to block 1504. If the file does not contain a defstart command, then the program executes the deffld1 command associated with the first field of the displayed form and then proceeds to block 1504.

At block 1504, the program determines if it should return to the application program, i.e., the value in the autoskip field of the deffld1 command being executed equals illustratively 126 or 127. If the autoskip field contains a number other than 126 or 127, then the program proceeds to block 1505. Otherwise, it returns to the application program.

At block 1505, the program tests the value contained in the autotool field of the deffld1 command being executed. If the value is zero, then the program proceeds to block 1506 where it waits for a response from the user. Otherwise, the program proceeds to block 1515 to bring up the tool identified in the autotool field.

The program at block 1506, waits for the user to touch the touch screen. When the user touches the touch screen of panel 15, the program proceeds to block 1507 to determine if the user has touched a point within the boundary of a displayed field. If not, the program proceeds to block 1508 to check if the user has touched one of the function keys 32 through 37. If the program finds that the user has not touched one of those keys, it then proceeds to block 1509 to output an audible tone as an indication that the user has touched an invalid point. The program returns to block 1506 upon outputting the tone to wait for the next input from the user.

If the program at block 1508 finds that the user has indeed touched one of the function keys 32 through 37 it proceeds to block 1511 where it displays a menu of functions associated with the touched key, as discussed above. The program then proceeds to block 1512 upon completing that task. Block 1512 is representative of a software program which (a) waits for the user to select one of the items from the displayed menu and (b) processes the item selected by the user. After processing the user's selection, the program returns to block 1506 to wait for the next input from the user.

If, on the other hand, the determination made at block 1507 turns out to be positive, i.e., the program finds that the user has touched a valid field, then it proceeds to block 1510. At block 1510, the program tests the type field of the deffld1 command associated with the field touched by the user. If the type field indicates that the displayed field is a bit-mapped-graphics (BMG) field, then the program proceeds to block 1513. Otherwise, it proceeds to block 1514 where it erases the highlighting from the currently active field (if any) and highlights the field touched by the user. The program then proceeds to block 1504 to execute the deffld1 command associated with the newly highlighted field.

At block 1513, the program highlights the point on the display having the same coordinates as the touch point, as discussed above. The program then proceeds to block 1506.

As mentioned above, the program at block 1515 displays the tool identified in the autotool field of the deffld1 command being executed. It then proceeds to block 1516 to wait for the user to touch the tool.

When the user touches the touch screen the program proceeds to block 1517 to determine if the touch point is within the boundary of the displayed tool and transfers to block 1519 if it finds that to be the case. Otherwise, it proceeds to block 1518 where it outputs an error and returns to block 1516 to await receipt of the coordinates of the next touch point.

At block 1519, the program tests to see if the user has touched the exit icon of the displayed tool and proceeds to block 1520 if the result of the test turns out to be affirmative. At block 1520, the program erases the displayed tool and then proceeds to block 1506. Otherwise, the programs proceeds to block 1521 if the results of the test made at block 1520 turns out to be negative. At block 1521 the program determines if the user has touched the move icon of the displayed tool and proceeds to block 1522 if it finds that to be the case. At block 1522, the program "moves" the displayed tool in the direction of the point touched by the user. The program upon "moving" the tool returns to block 1516.

The program, on the other hand, proceeds to block 1523 if it finds that the user has not touched the move icon. At block 1523, the program determines if the tool that is being touched is one of the predefined tools, discussed above. If it finds that to be the case, then the program proceeds to block 1524. Otherwise, the program considers the displayed tool to be a tool that is defined by the user, for example, station set tool 120 shown in FIG. 12, and proceeds to block 1525 where it passes the input (coordinates of the touched point) to the application program. The program then proceeds to block 1516 upon completing that task.

At block 1524, the program determines if the tool that is being displayed is a menu without an E or E/S key, such as menu 40 depicted in FIG. 3. If this determination is affirmative, then the program transfers to block 1526 where it (a) loads the menu item touched by the user in the corresponding field, (b) removes the highlighting from the field, and (c) proceeds to block 1527 to erase the displayed tool. The program proceeds to block 1528 upon completing the above task.

Block 1528 is representative of a software routine which (a) transfers to block 1506 if the user has touched the E key of the previously displayed tool or the autoskip field of the command being executed contains a zero, or (b) transfers to block 1529 to highlight the next field if the user has touched the E/S key of the previously displayed tool. At block 1529, the program highlights the field identified by the value contained in the autoskip field of the command being executed and then transfers to block 1504 to execute the deffld1 command associated with the newly highlighted field.

If the determination made at block 1524 is negative, then the program proceeds to block 1530 where it tests the coordinates of the touch point to see if they match the coordinates of either the E or E/S key of the displayed tool and transfers to block 1526 if it finds that to be the case. Otherwise, it proceeds to block 1531.

At block 1531, the program determines if the displayed tool is the calculator tool and passes the coordinates of the touch point to block 1532 if it finds that to be the case. Block 1532 is representative of a calculator program which processes user's inputs when the calculator tool is displayed. The calculator program processes inputs similar to the way that a hand-held calculator processes inputs. The calculator program also displays the result brought about by the user's input (i.e, the result of a multiplication, division, addition, etc.) in the display section of the tool, as represented by block 1533.

If the result of the determination made at block 1531 is negative, then the program proceeds to block 1533 where it displays the designation (label) of the tool button that is displayed at the coordinates of the point touched by the user, the label being displayed in the display section of the tool. Block 1533 then transfers to block 1516 upon completing its task.

Figure 18:
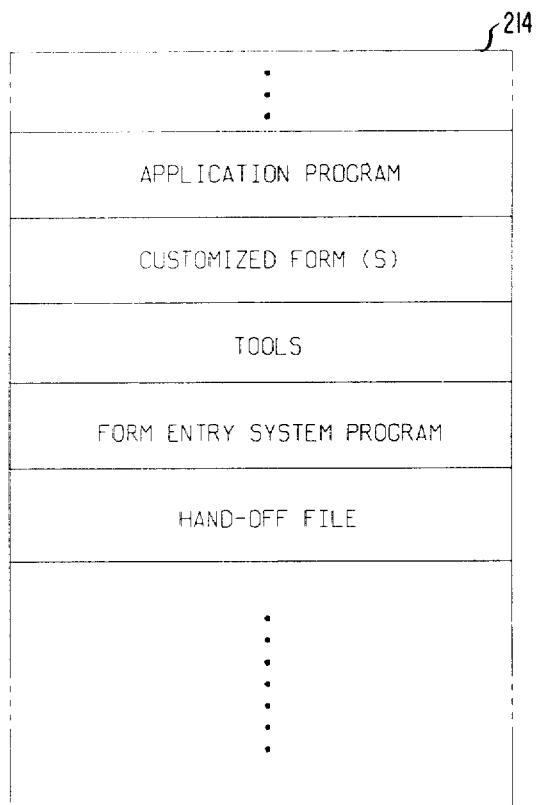
FIG. 18 illustrates a portion of memory contained within the computer of FIG. 1 in which is stored, inter alia, the form shown in FIG. 2.

FIG. 18 illustrates a layout of the (a) application program and form entry system program of FIGS. 15 and 16, (b) customized forms, such as form 30, (c) tools, such as tools 40, 50, 60, 70, 80, 100, and 120, discussed above, and (d) hand-off file, discussed above, in the hard disk 214 of computer 20.

The foregoing is merely illustrative of the principles of our invention. Those skilled in the art will be able to devise numerous arrangements which, although not explicitly shown or described herein, embody those principles that are within its spirit and scope.

What is claimed is:

1. An arrangement for use in a computer having a display associated therewith comprising
   means for displaying on said display a pattern including a plurality of information fields and for identifying for each field a kind of information to be inserted therein,
   means for indicating a particular one of said information fields into which information is to be inserted and for concurrently displaying a predefined tool associated with said one of said fields, said predefined tool being operable to supply information of the kind identified for said one field, said tool being selected from a group of predefined tools including at least a tool adapted to supply an individual entry from a menu of alternatives and at least a tool adapted to allow said user to compose said information, and
   means for inserting in said one field information that is derived as a result of said user operating said displayed tool.

2. The arrangement set forth in claim 1 wherein said group of predefined tools further includes a tool which displays transitory information, said transitory information being changed periodically.

3. The arrangement set forth in claim 2 wherein said tool which displays transitory information includes at least a date and time tool.

4. The arrangement set forth in claim 1 wherein said tool adapted to allow said user to compose said information includes at least a number pad, a keyboard, and a calculator.

5. The arrangement set forth in claim 1 further comprising means for obtaining from a host computer the information that is to be inserted in one or more of said fields.

6. The arrangement set forth in claim 1 wherein said display includes a touch-sensitive screen overlaying said display.

7. The arrangement set forth in claim 1 wherein at least one of said fields is a bit-mapped-graphics field adapted to allow said user to compose said information by writing on said bit-mapped-graphics field.

8. The arrangement set forth in claim 1 further comprising means for displaying a menu of labels identifying respective ones of said group of predefined tools and for displaying one of said predefined tools when said user points to its label.

9. The arrangement set forth in claim 1 wherein said computer includes at least one telephone line connected to a telephone system and wherein one of said predefined tools is adapted to operate as a telephone station set when it is displayed on said display to allow said user to establish a telephone call over said at least one telephone line by touching respective buttons displayed in said telephone station set tool.

10. An arrangement for use in a computer having a display comprising
    means for displaying a plurality of information fields and for identifying for each field a kind of information to be inserted therein,
    means for storing a plurality of predefined tools associated with respective ones of said fields, each of said tools being adapted to supply information of the kind identified for its associated field, and
    means responsive to information being inserted in at least one of said fields for indicating another of said fields to be filled in and for concurrently displaying the respective one of said tools to be used by said user to supply the kind of information identified for said other field.

11. The arrangement set forth in claim 10 wherein said one tool is selected from a group of tools including (a) a menu tool which displays a plurality of predefined items in which said user selects one of said items to be inserted in the associated field by pointing to that item, and (b) a tool adapted to allow said user to compose the information to be inserted in the associated field.

12. The arrangement set forth in claim 11 wherein said group of tools further includes a tool which displays information which is changed periodically so that the information that is to be inserted in the associated field is current.

13. The arrangement set forth in claim 10 wherein said plurality of predefined tools includes at least a number pad, a keyboard, and a calculator.

14. The arrangement set forth in claim 10 further comprising means for obtaining from a host computer the information that is to be inserted in one or more of said fields.

15. The arrangement set forth in claim 10 wherein said display includes a touch-sensitive screen overlaying said display.

16. The arrangement set forth in claim 10 wherein at least one of said fields is a bit-mapped-graphics field adapted to allow said user to compose said information by writing on said bit-mapped-graphics field.

17. The arrangement set forth in claim 10 further comprising means for displaying a menu of labels identifying respective ones of said predefined tools and for displaying one of said tools when said user points to its label.

18. The arrangement set forth in claim 10 wherein said computer includes at least one telephone line connected to a telephone system and wherein one of said predefined tools is adapted to operate as a telephone station set when it is displayed on said display to allow said user to establish a telephone call over said at least one telephone line by touching respective buttons displayed in said telephone station set tool.

19. A method for use in a computer having a display comprising the steps of displaying on said display a plurality of information fields, identifying for each field a kind of information to be inserted therein, indicating a particular one of said information fields into which information is to be inserted and for concurrently displaying a predefined tool associated with said one of said fields, said predefined tool being operable to supply information of the kind identified for said one field, said tool being selected from a group of predefined tools including a tool adapted to supply an individual entry from a menu of alternatives and at least a tool adapted to allow said user to compose said information, and inserting in said one field information that is derived as a result of said user operating said displayed tool.

20. The method set forth in claim 19 wherein said inserting step includes the step of obtaining from a host computer information that is to be inserted in one or more of said fields.

21. The method set forth in claim 19 wherein the step of displaying said pattern includes the step of displaying one or more of said information fields as a bit-mapped-graphics field.

22. The method set forth in claim 19 further comprising the steps of displaying a menu of labels when directed to do so by a user, said labels identifying respective ones of said predefined tools, and displaying the respective predefined tool when said user points to its label.

* * * * *

US004763356C1

(12) EX PARTE REEXAMINATION CERTIFICATE (7384th)
United States Patent
Day, Jr. et al.

(10) Number: US 4,763,356 C1
(45) Certificate Issued: Mar. 2, 2010

(54) TOUCH SCREEN FORM ENTRY SYSTEM

(75) Inventors: Benjamin W. Day, Jr., Rumson, NJ (US); Alexander C. Gillon, Aberdeen, NJ (US); Raoul A. LeConte, Howell, NJ (US)

(73) Assignee: Lucent Technologies, Inc., Murray Hill, NJ (US)

Reexamination Request:
No. 90/008,625, May 3, 2007
No. 90/008,749, Jul. 3, 2007

Reexamination Certificate for:
Patent No.: 4,763,356
Issued: Aug. 9, 1988
Appl. No.: 06/940,408
Filed: Dec. 11, 1986

(51) Int. Cl.
*G06F 3/023* (2006.01)
*G06F 17/24* (2006.01)
*G06F 3/033* (2006.01)
*H04M 1/274* (2006.01)
*H04M 1/2745* (2006.01)

(52) U.S. Cl. ............... 379/368; 178/18.01; 345/173; 345/902; 379/396; 379/915; 379/916; 379/93.19; 715/251; 715/790

(58) Field of Classification Search ........... 379/368, 379/396, 915, 916, 93.19; 178/18.01; 345/173, 345/902; 715/251, 790
See application file for complete search history.

(56) References Cited

U.S. PATENT DOCUMENTS 4,516,266 A * 5/1985 Christopher et al. ........ 382/190
4,763,356 A    8/1988 Day, Jr. et al.

OTHER PUBLICATIONS

Datamation, vol. 30, No. 1, Jan. 1984, pp. 146–154.
*Lucent Technologies, Inc.* v. *Gateway, Inc. Gateway Country Stores LLC; and Microsoft Corporation; and Dell, Inc.*; Claim Construction Order Clarifying and Superceding the Order of Mar. 1, 2004, Construing Claims for Patent 4,763,356, Civil No. 02CV2060–B(LAB), 03CV0699–B(LAB), 03CV1108–B(LAB); Amended Order Superceding the Order of Oct. 29, 2003, Construing Claims for Patent No. 4,763,356, Civil No. 02CV2060–B(LAB), 03CV0699–B(LAB), U.S. District Court Southern District of California.
Tyler, *Datamation*, vol. 30 No. 1, Jan. 1984, pp. 146–154.
Welch, *The Home Accountant and Financial Planner for the Macintosh, User's Guide*, Arrays, Inc./Continental Software, Jan. 1985.
Apple Macintosh Manual, Apple Computer, Inc. 1984.
Newman and Sproul, *Principles of Interactive Computer Graphics, Second Edition*, McGraw–Hill 1979.

* cited by examiner

*Primary Examiner*—Alexander J Kosowski

(57) ABSTRACT

A personal computer connected to a display and touch screen panel is provided with a form entry system integrated therewith. The form entry system is adapted to display a predefined form and to automatically display a predefined tool, such as a keyboard, menu, calculator, etc., to facilitate inputting information in a respective field of the form or chart. Specifically, the user is prompted as to which field is to be filled in by highlighting the field and concurrently displaying as an overlay (window) the tool that the user will use to input the information called for by the highlighted field. In the case where a field calls for illustratively the insertion of a name, the system may be adapted to display a menu of names as the tool for filling in that field. The user selects the name that he or she desired to be inserted in the field by touching that name. The system responsive thereto inserts the name in that field, highlights the next field to be filled in and displays the tool for filling that field. The system may also be adapted to communicate with a host computer to obtain the information that is to be inserted in one or more fields. Also, the user may erase the tool that is displayed by the system and direct the system to display another tool, such as the aforementioned keyboard.

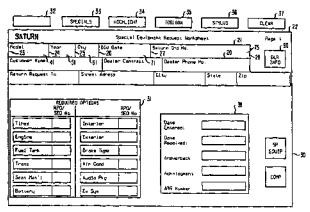

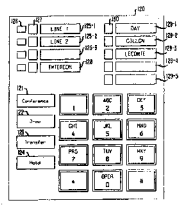

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 19 and 21 is confirmed.

Claims 1–18, 20, and 22 were not reexamined.

* * * * *